United States Patent Office 3,313,353
Patented Apr. 11, 1967

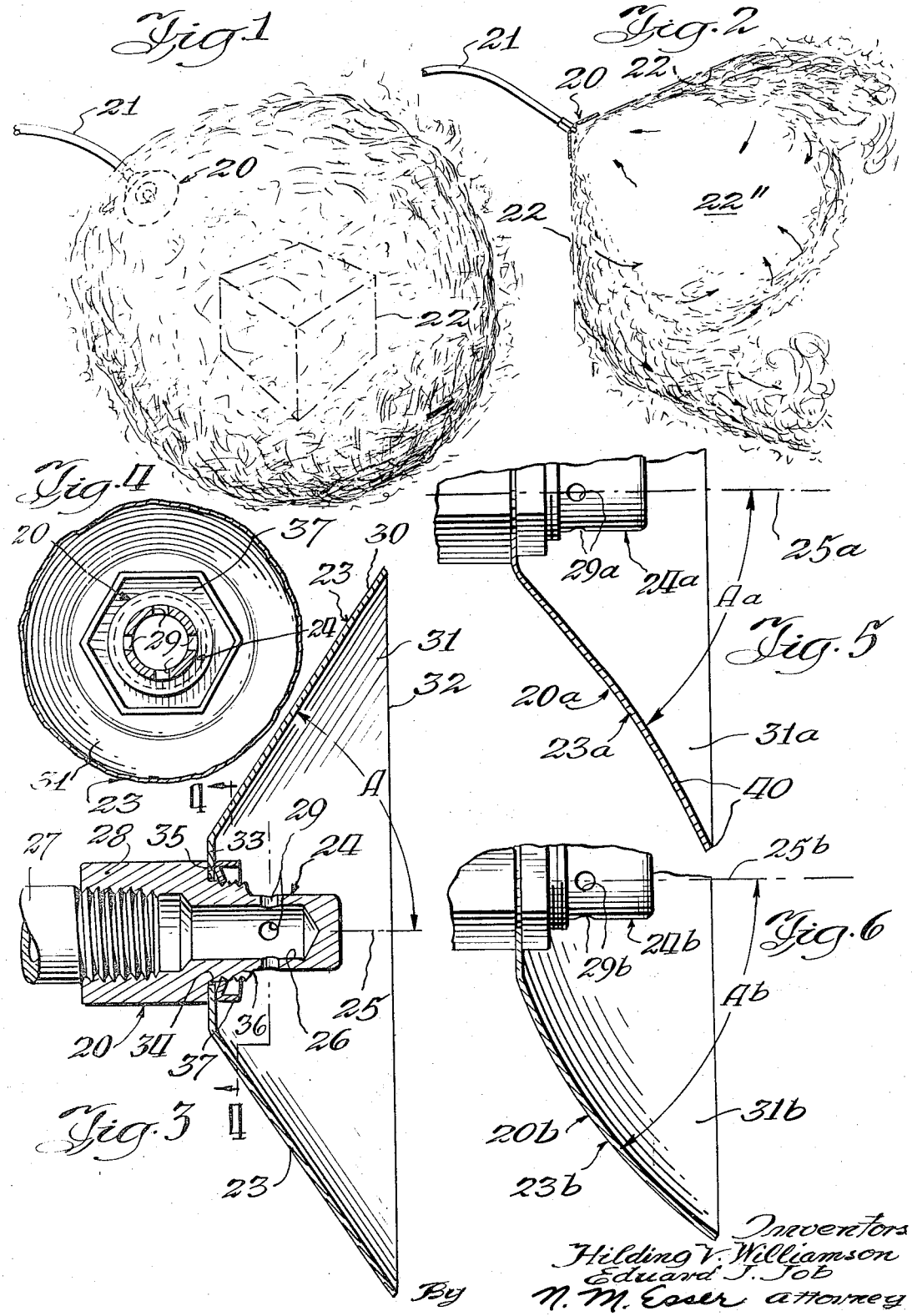

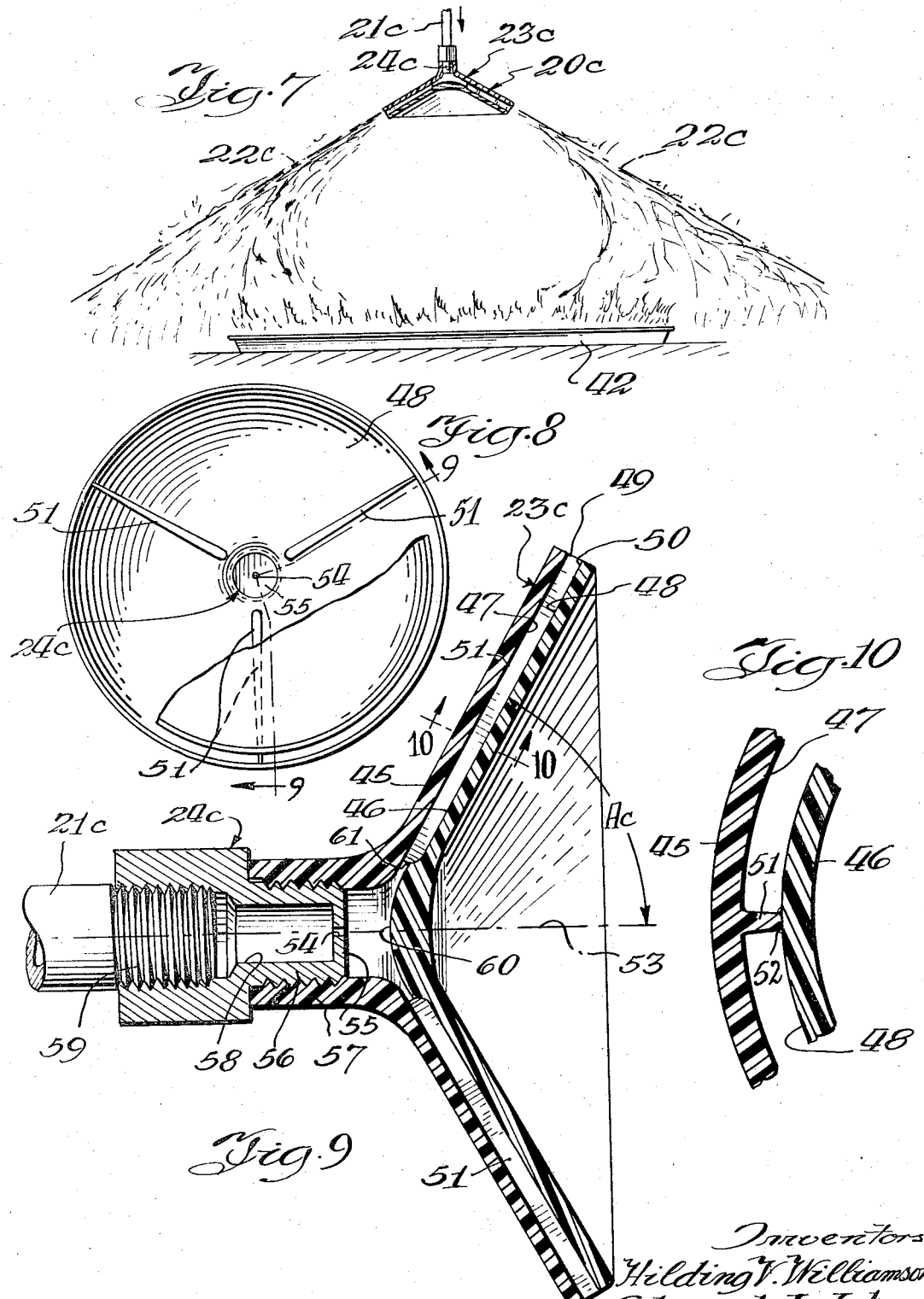

3,313,353
NOZZLE AND METHOD OF EXTINGUISHING FIRES
Hilding V. Williamson and Eduard J. Job, Chicago, Ill., assignors to Chemetron Corporation, Chicago, Ill., a corporation of Delaware
Filed May 15, 1964, Ser. No. 367,673
4 Claims. (Cl. 169—1)

This invention relates to a nozzle and to a method of extinguishing fires.

Carbon dioxide gas, discharged under pressure directly through an orifice, issues at extremely high velocity. If this high velocity discharge is directed onto a fire, it can be ineffective because entrained air may result in merely fanning the fire. In addition, if the fire involves a liquid fuel, a tendency to splash some of the fuel may result, thus possibly spreading the fire.

In general, nozzles for discharging carbon dioxide gas have been designed to reduce the velocity of the discharge so that the carbon dioxide gas is discharged more gently onto the fire. This tends to minimize the tendency towords splashing and of the entrainment of air which may reduce the efficiency of the extinguishing effect when applied directly onto the fire. Some of the energy of the carbon dioxide gas discharged against a horn of the nozzle is dissipated through turbulence and friction and is converted into heat energy which is taken up by the evaporation of some of the solid carbon dioxide particles in the discharge. Nozzles of this type give a generally cylindrical discharge stream. Examples of this type are disclosed in U.S. Patents Nos. 1,760,274 and 2,985,383.

Water or other liquids can be discharged in a conical spray pattern without difficulty because air is allowed to enter between the liquid droplets.

When discharging carbon dioxide gas in a cylindrical pattern onto a burning surface, the discharged gas does not substantially spread out to cover the surface until it strikes and is deflected by the surface. Thus, the nature of the surface may be an important factor is regard to the area over which the discharged gas will spread and cover. If the surface is part of a 3-dimensional object or if the surface has a framework with wiring and other irregular and discontinuous items, the discharged gas may pass through without spreading out over all of the burning items. Thus, a wide discharge pattern in accordance with the invention is very desirable.

In accordance with the invention carbon dioxide gas is discharged into a hollow conical curtain pattern. There is some tendency for the discharged gas to entrain air both inside and outside of the hollow conical pattern. The entrainment of air on the inside of the conical pattern tends to create a vacuum within the hollow conical pattern, thus drawing in some gas to form the base of the cone. If the cone angle is 90 degrees or less, the vacuum created on the inside of the pattern will be so strong that the gas is pulled into a cylindrical pattern. With cone angles of about 110 degrees and greater this does not happen. The hollow conical discharge pattern tends to shield its inside volume against the outside atmosphere. Thus, the inside of the cone is protected and tends to fill up with the total flooding concentration of carbon dioxide gas as some low velocity gas from the base of the cone is drawn back into the inside of the hollow cone. Two or more nozzles may be used in co-operative arrangement to protect or cover a volume containing combustible material in any form.

A conical pattern having a lower discharge velocity can be obtained by using a double cone nozzle. In this nozzle, the gas being discharged is effectively shielded by inner face-to-face conical surfaces defined by adjacent nozzle horns having sufficient length so that the discharge velocity is at a relatively low level.

In accordance with the invention there is provided a method of extinguishing fires with carbon dioxide gas, by discharging carbon dioxide gas into a moving hollow conical curtain pattern at a sufficient velocity to define an inside volume which is separated from the outside atmosphere while at the same time creating a carbon dioxide gas concentration within the volume at a sufficiently high level to extinguish fires.

It is a feature of the invention to provide a method of extinguishing fires by discharging carbon dioxides gas into a wide pattern resembling an essential hollow cone. By this method, the discharged carbon dioxide gas can be used to envelope a relatively large volume.

A nozzle in accordance with the invention has a horn having at least one generally conical inner surface diverging to an open discharge end, with the cone angle of the inner surface being not less than about 110 degrees, and having an orifice tip for discharging gaseous fluid against the inner surface. The wide pattern of discharge provided by the nozzle of the invention is particularly useful where it is desired to envelope a large volume with a gaseous fire extinguishing medium such as carbon dioxide gas.

In the drawings:

FIGURE 1 is a perspective view showing a nozzle in accordance with one embodiment of the invention and showing the manner by which carbon dioxide gas is discharged into a relatively wide pattern;

FIGURE 2 is a sectional view through the nozzle and showing that the pattern of the discharged carbon dioxide gas takes the form of an essentially hollow cone;

FIGURE 3 is a sectional view of the nozzle shown in FIGURE 1 and 2;

FIGURE 4 is a sectional view taken along line 4—4 of FIGURE 3;

FIGURE 5 is a fragmentary view, partly in section, showing a nozzle in accordance with another embodiment of the invention;

FIGURE 6 is a fragmentary view, partly in section, showing a nozzle in accordance with another embodiment of the invention;

FIGURE 7 is a sectional view showing a nozzle in accordance with another embodiment of the invention and showing that the pattern of the carbon dioxide gas takes form of an essential hollow cone;

FIGURE 8 is an end view, partly broken away, of the nozzle shown in FIGURE 7;

FIGURE 9 is a sectional view taken along line 9—9 of FIGURE 8; and

FIGURE 10 is a sectional view taken along line 10—10 of FIGURE 9.

In FIGURE 1 of the drawings there is shown a nozzle generally indicated at 20, suitable for carrying out the above described method, connected by a conduit 21 to a suitable source of fire extinguishing medium under pressure, such as carbon dioxide.

The carbon dioxide gas discharged by the nozzle 20 is shown in FIGURE 1 to be discharged generally toward an object 22' which is on fire.

As seen in FIGURE 2, the discharged carbon dioxide gas forms a moving essentially hollow conical curtain pattern as indicated by phantom lines 22. The pattern is not less than about 110 degrees at its origin and is preferably between about 110 degrees and 140 degrees. The essentially hollow conical pattern causes the carbon dioxide gas to envelope a large volume 22″ which is separated from the outside atmosphere.

As best seen in FIGURES 3 and 4, the nozzle 20 is shown to include a horn generally indicated at 23 and an orifice tip generally indicated at 24. The orifice tip 24, disposed along cone axis 25 of the horn 23, is shown to have a passage 26. The passage 26 communicates with the conduit 21 which is shown to be threadably secured in an internally threaded portion 28 of the orifice tip 24. Apertures 29 provide communication with the passage 26 in the inside of the horn 23. The apertures 29 are illustrated as being spaced equally apart and as extending perpendicularly to the cone axis 25.

The horn 23 includes a generally conical portion 30 having a generally conical inner surface 31. The conical inner surface 31 terminates at an open discharge end 32. The other end of the conical surface 31 joins an end wall portion 33 which is generally perpendicular to the cone axis 25 and which has a central aperture 34 to receive the orifice tip 24. The threaded portion 28 has a shoulder 35 that abuts against the outer surface of the wall portion 33. The portion of the orifice tip which lies inside the horn 23 is threaded as indicated at 36 to threadably receive a sheet metal nut 37 which abuts against the inner surface of the wall portion 33.

The inner surface 31 of the conical portion 30 of the horn 23 is generally conical and has an included or cone angle of not less than about 110 degrees. The angle A is equal to one-half the cone angle. The cone angle is shown to be sufficiently less than 180 degrees so that the gas streams discharged through the orifices 29 spread out as they strike the inner surface 31 so that the streams meet to form a hollow cone before they leave the discharge end 32.

A horn having a cone angle of 90 degrees is completely unsatisfactory in accomplishing the purposes of the invention because the pattern is generally cylindrical in form.

Referring now to the embodiment of FIGURE 5, there is provided a nozzle 20a having a generally conical horn 23a and an orifice tip generally indicated at 24a. The orifice 24a has orifices 29a. The nozzle 20a is identical to the nozzle 20 with the exception that an inner surface 31a of the horn 23a is slightly convex. An angle Aa, measured between the inner surface 31 and an axis 25a of the horn 23a, has the same range of magnitude as the angle A, but it is preferred that the marginal end 40 of the inner surface form an angle of about 65 degrees with the axis 25a of the horn 23a. The discharged carbon dioxide gas generally follows the contour of the inner surface 31, even at the marginal end 40.

In the embodiment of FIGURE 6, there is provided a nozzle 20b having a generally conical horn 23b and an orifice tip 24b. The orifice tip 24b has orifices 29b. The nozzle 20b is identical to the nozzle 20 with the exception that an inner surface 31b of the horn 23b is slightly concave. An angle Ab, measured between inner surface 31b and the axis 25b of the horn 23b, has the same range of magitude as the angle A.

In the embodiment of FIGURES 7 through 10 there is shown a nozzle generally indicated at 20c having a horn 23c and an orifice tip 24c. A conduit 21c is shown to be connected to the orifice tip 24c of the nozzle 20c. As shown in FIGURE 7, the nozzle 20c is employed to extinguish a surface fire existing in a pan 42. It is seen that the pattern formed by the nozzle 20c takes the form of an essentially hollow cone as indicated by phantom lines 22c being not less than about 110 degrees at its origin.

The horn 23c is shown to include generally conical members 45 and 46 having generally conical face-to-face inner surfaces 47 and 48 terminating at discharge ends 49 and 50, respectively. The members 45 and 46 are spaced apart by spacers or flanges 51 which are shown to be located at 120 degrees from each other. The flanges 51 are shown to be formed integrally with the conical portion 45 and to be suitably secured to the member 46 for example by a solvent seal or an adhesive as indicated at 52 in FIGURE 10. Flanges 51 thus serve to hold the inner surfaces 47 and 49 properly spaced from each other. The conical surfaces 47 and 48 are shown to have a common axis 53.

An angle Ac, measured for example between the axis 53 and the inner surface 48 of the horn 23c, has the same range of magnitude as the angle A. The inner surfaces 47 and 48 are shown to have the same cone angle. The orifice tip 24c is shown to have an orifice 54 disposed along axis 53. The orifice 54 is formed in an end wall 55 of the orifice tip 24c. The end wall 55 joins an externally threaded portion 56 which is threadably received in an internally threaded extension 57 of the conical member 45. A passage 58 threadably receives a threaded end 59 of the conduit 21c. The orifice 54 enables a gaseous fire extinguishing medium such as carbon dioxide gas to be discharged against an inclined surface 60 by which it is dispersed and from which it passes into the space between the generally conical surfaces 47 and 48 from the periphery 61 of the inclined surface 60. The periphery 61 is disposed approximately midway between the surfaces 47 and 48 so that the carbon dioxide gas passes midway between the surfaces 47 and 48 as it passes the periphery 61.

The horn 23c thus provides a double cone arrangement having a low discharge velocity because the discharged carbon dioxide gas is effectively shielded by inner conical surfaces 47 and 48 which are of sufficient length to reduce the velocity of the gas to a low level.

Other embodiments and modifications of this invention will suggest themselves to those skilled in the art, and all such of these as come within the spirit of this invention are included within its scope as best defined by the appended claims.

What is claimed is:

1. A nozzle for discharging gaseous fluids: a horn having a pair of generally conical inner surfaces having opening discharge ends and being disposed in face-to-face relationship with respect to each other, and an orifice tip for discharging a gaseous fluid against one of said inner surfaces to effect dispersion and passage of the gaseous fluid between said inner surfaces toward their discharge ends, each conical surface having a cone angle of not less than about 110 degrees, said inner surfaces being disposed relatively close to each other and being of sufficient length to substantially reduce the velocity at which the gaseous fluids are discharged.

2. A nozzle for discharging gaseous fluids, comprising: a horn having a pair of generally conical inner surfaces having open discharge ends and being disposed in face-to-face relationship with respect to each other, an orifice from which gaseous fluid is directed between said surfaces at a location opposite their discharge ends, means for holding said inner surfaces in spaced apart position with respect to each other, said inner surfaces having cone angles of not less than about 110 degrees, and means for directing gaseous fluid substantially midway between said inner surfaces and toward said discharge ends.

3. A nozzle for discharging gaseous fluids, comprising: a horn having a pair of generally conical inner surfaces disposed in face-to-face relationship with respect to each other, means for directing gaseous fluid between said conical surfaces including an orifice, said inner surfaces having substantially equal cone angles, each conical surface having a cone angle of not less than about 110 degrees and sufficiently less than 180 degrees so that the gaseous fluid discharged between said inner surfaces spreads out to form a hollow conical curtain pattern as it strikes said inner surface, said conical surfaces being of sufficient length and disposed relatively close to each other to substantially reduce the velocity at which the gaseous fluid is discharged.

4. Method of extinguishing fires with carbon dioxide gas, comprising the steps of: passing carbon dioxide gas through orifice means at a predetermined velocity, directing the gas at a lesser velocity into a pattern resembling generally a hollow conical curtain having a cone angle of not less than about 110 degrees at its origin to create a sufficient dioxide concentration within the curtain to extinguish fires, with the carbon dioxide curtain being directed toward a fire to be extinguished.

References Cited by the Examiner
UNITED STATES PATENTS

| | | | |
|---|---|---|---|
| 1,788,779 | 1/1931 | Regester | 239—520 |
| 2,216,072 | 9/1940 | Ensminger | 169—11 |
| 2,655,219 | 10/1953 | Ensminger | 169—11 X |

FOREIGN PATENTS

| | | |
|---|---|---|
| 426,525 | 4/1935 | Great Britain. |
| 178,692 | 7/1935 | Switzerland. |

EVERETT W. KIRBY, *Primary Examiner.*

J. HUSSER, *Assistant Examiner.*